United States Patent

Mezey et al.

[15] 3,652,211

[45] Mar. 28, 1972

[54] PROCESS FOR THE PREPARATION OF AN ANHYDRIDE OF TRIVALENT PHOSPHORUS USING EXCITED CARBON DIOXIDE OR NITRIC OXIDE

[72] Inventors: Eugene J. Mezey, Upper Arlington; Robert E. Hall, Wyoming, both of Ohio

[73] Assignee: The Proctor & Gamble Company, Cincinnati, Ohio

[22] Filed: Sept. 25, 1969

[21] Appl. No.: 861,159

[52] U.S. Cl............................23/165, 204/157.1, 204/164
[51] Int. Cl................C01b 25/00, C01b 25/12, C01b 25/16
[58] Field of Search................23/165, 202; 204/157.1 H, 164

[56] References Cited

UNITED STATES PATENTS

| | | | |
|---|---|---|---|
| 3,438,720 | 4/1969 | Cleaver | 23/1 |
| 3,501,262 | 3/1970 | Arkless et al. | 23/21 |
| 3,532,461 | 10/1970 | Whyte et al. | 23/165 |

*Primary Examiner*—Earl C. Thomas
*Assistant Examiner*—Gregory A. Heller
*Attorney*—Julius P. Filcik

[57] ABSTRACT

A process for preparing an anhydride of trivalent phosphorus from elemental phosphorus using an electronically-excited carbon dioxide plasma stream or an electronically-excited nitric oxide plasma stream is disclosed. The anhydride of trivalent phosphorus is useful as an intermediate in the preparation of detergency builders for use in detergent compositions.

13 Claims, No Drawings

PROCESS FOR THE PREPARATION OF AN ANHYDRIDE OF TRIVALENT PHOSPHORUS USING EXCITED CARBON DIOXIDE OR NITRIC OXIDE

FIELD OF THE INVENTION

This invention relates to a process for the preparation of phosphorus compounds. More particularly, this invention relates to a process for the preparation of an anhydride of trivalent phosphorus from elemental phosphorus. This invention also relates to a process for the preparation of an anhydride of trivalent phosphorus from elemental phosphorus using a heretofore unknown synthetic technique.

BACKGROUND OF THE INVENTION

Methods for the preparation of the anhydride of trivalent phosphorus, phosphorus trioxide, are not numerous and only recently have methods for preparing phosphorus trioxide on a commercial scale been developed. A known laboratory method of preparing phosphorus trioxide by burning phosphorus in oxygen is described by Wolf and Schmager, in Chem. Ber., 62, 771-786 (1929). The yield of phosphorus trioxide by the procedure of Wolf et al., supra, rarely exceeds about 50 percent and is usually substantially less than that amount. In addition using the procedure described by Wolf et al., supra, by-products consisting largely of $P_4O_{10}$, red phosphorus and the like are formed in large quantities.

Heinz and Thilo (German Democratic Republic Patent No. 26,660) have also disclosed a method of preparing phosphorus trioxide by reacting phosphorus pentoxide with $N_2O$ but by-products are obtained with the desired product.

In addition a process for the preparation of phosphorus trioxide is disclosed in U.S. Pat. No. 3,532,461. This process comprises reacting elemental phosphorus, oxygen, and at least one carbon oxide at a temperature in excess of 1,500° C. until substantially complete equilibrium is achieved. This process is an improvement in the art of producing trivalent phosphorus compounds over those methods known in the art and the yields of trivalent phosphorus are greater than those previously obtained in the art.

All of the above-cited methods of preparing phosphorus trioxide involve typically chemical techniques in which phosphorus trioxide is prepared by burning phosphorus in the presence of oxygen or of reducing phosphorus pentoxide in the presence of a chemical reductant such as $N_2O$. The process of this invention is a completely different approach to the synthesis of phosphorus trioxide whereby phosphorus trioxide is prepared by oxidizing elemental phosphorus using a synthetic technique hereinbefore unknown.

The use of plasma flames to effect chemical syntheses not possible by conventional techniques is a recent development. Synthesis of phosphorus trioxide from elemental phosphorus has not been attempted. The copending application of Allen K. Reed, William M. Goldberger, and David D. Whyte, Ser. No. 860,776, filed Sept. 24, 1969, for Process for the Preparation of an Anhydride of Trivalent Phosphorus, involves the reaction of an anhydride of pentavalent phosphorus with carbon monoxide in a reaction zone at a temperature of from 1,500° K. to about 20,000° K. The temperature of the reaction zone is achieved using an inert gas plasma flame obtained by a direct current arc discharge through an inert gas stream. This process is a departure from those processes previously known in the art and is accomplished through the contacting of phosphorus trioxide with carbon monoxide at extremely high temperatures obtainable only through the use of a plasma flame. The copending application of Eugene J. Mezey, Ser. No. 861,145, filed Sept. 25, 1969, for Process for the Preparation of an Anhydride of Trivalent Phosphorus Using Excited Helium, is a different approach for the preparation of an anhydride of trivalent phosphorous using an electronically-excited helium plasma flame. The electroncially-excited helium plasma flame provides the energy necessary to convert the anhydride of pentavalent phosphorus into the anhydride of trivalent phosphorus.

The preparation of compounds in which the phosphorus atom exists in a +3 oxidation state has been rendered difficult, in part, by the complex nature of the phosphorus atom. The phosphorus atom can exist in compounds in which the oxidation state of the phosphorus atom ranges from $-3$, as in phosphine ($PH_3$), to $+5$, as in phosphoric acid ($H_3PO_4$), pyrophosphoric acid ($H_4P_2O_7$), phosphate salt ($M_4PO_4$), and metaphosphate salts ($MPO_3$). Compounds in which phosphorus atoms exist in an oxidation state intermediate between $-3$ and $+5$ are also known, e.g., phosphorus monoxide ($P_2O$), phosphite salts ($M_3PO_3$), hypophosphoric acid ($H_4P_2O$), and the like. Thus, methods of preparing phosphorus compounds having a particular oxidation state intermediate between $-3$ and $+5$ are either quite specific, do not result in high yields of the desired products, or are contaminated with by-products because of the ease with which phosphorus compounds having oxidation states other than the desired intermediate oxidation state can be prepared.

Accordingly, it is an object of this invention to prepare an anhydride of trivalent phosphorus using a technique hereinbefore unknown and unlike the typical chemical syntheses previously known.

In addition, it is an object of this invention to prepare an anhydride of trivalent phosphorus from elemental phosphorus and electronically-excited carbon dioxide or electronically-excited nitric oxide at essentially room temperature without the necessity of using equipment compatible with high temperatures hereinbefore used to accomplish the preparation of the anhydride of trivalent phosphorus.

In addition, it is an object of this invention to prepare an anhydride of trivalent phosphorus in essentially pure form.

Also, it is an object of this invention to convert elemental phosphorus, which is known and commonly available, into a valuable and useful anhydride of trivalent phosphorus. The anhydride of trivalent phosphorus is a valuable intermediate in the preparation of detergency builders for use in detergent compositions. For example, the anhydride of trivalent phosphorus is used in the preparation of ethane-1-hydroxy-1,1-diphosphonic acid and its salts, which are valuable builders for use in detergent compositions as described by Francis L. Diehl, in U.S. Pat. No. 3,159,581, patented Dec. 1, 1964. In addition the anhydride of trivalent phosphorus is useful in the preparation of phosphorus acid of known utility simply by mixing the anhydride of trivalent phosphorus with water.

Additionally, it is an object of this invention to provide a process for the preparation of an anhydride of trivalent phosphorus from elemental phosphorus and electronically-excited carbon dioxide or electronically-excited nitric oxide using an extremely modern technological approach and a heretofore-unknown process.

SUMMARY OF THE INVENTION

The objects of this invention are achieved according to the process described herein. This heretofore-unknown process for preparing an anhydride of trivalent phosphorus comprises subjecting elemental phosphorus to a plasma stream of an electronically-excited gas selected from the group consisting of carbon dioxide and nitric oxide in a reaction zone, said plasma stream being characterized as a stream of carbon dioxide or nitric oxide irradiated with electromagnetic energy having a frequency of from 300 megaHertz to 100,000 megaHertz. This new and novel process allows the reaction products to be obtained rapidly, efficiently, and in essentially pure form.

More specifically, the process of this invention for the preparation of an anhydride of trivalent phosphorus comprises subjecting elemental phosphorus to a plasma stream of electroncially-excited gas selected from the group consisting of carbon dioxide and nitric oxide whereby the elemental phosphorus is oxidized to the anhydride of trivalent phosphorus due to the presence of active oxygen species and the energy supplied by the electronically-excited carbon dioxide or nitric oxide. The anhydride of trivalent phosphorus can then be separated from the reaction products obtained in the process by conventional and well-known techniques. The anhydride of trivalent phosphorus can then be used to prepare useful compounds, as for example, ethane-1-hydroxy-1,1-diphosphonic acid, and its salts, as hereinbefore mentioned.

In the process described herein, the anhydride of trivalent phosphorus is produced. As used herein, the term anhydride of trivalent phosphorus and the term phosphorus trioxide are intended to encompass $P_4O_6$, $P_2O_3$ (historically and conventionally used as the formula for phosphorus trioxide), and ($P_2O_3$). Hereinafter the terms, anhydride of trivalent phosphorous, phosphorus trioxide and $P_4O_6$ are used interchangeably. The term electronically-excited carbon dioxide and electronically-excited nitric oxide are used herein to designate carbon dioxide or nitric oxide which has been subjected to electromagnetic radiation wherein the electromagnetic radiation converts the carbon dioxide or nitric oxide into extremely energetic species.

DETAILED DESCRIPTION OF THE INVENTION

The process described above whereby phosphorus trioxide is produced from elemental phosphorus comprises subjecting elemental phosphorus to a plasma stream of an electronically-excited gas such as carbon dioxide or nitric acid in a reaction zone.

The process of this invention for the preparation of an anhydride of trivalent phosphorus from elemental phosphorus using electronically-excited carbon dioxide, $CO_2^*$, or electronically-excited nitric oxide, $NO^*$, can be summarized schematically by the following two overall equations:

$$P_4 + 6CO_2^* \rightarrow P_4O_6 + 6CO$$

and $$P_4 + 6NO^* \rightarrow P_4O_6 + 3N_2$$

The above schematic equations involve the oxidation of elemental phosphorus using electronically-excited nitric oxide or carbon dioxide to result in phosphorus trioxide, $P_4O_6$, with the production of a carbon or nitrogen containing species in a lower oxidation state, e.g., CO or $N_2$ respectively.

The starting materials of the process of this invention are common and well known. For example, elemental phosphorus is commercially available. Carbon dioxide or nitric oxide is either commercially available or can be generated by conventional and well-known techniques. For example, carbon dioxide can be prepared by burning carbon in the presence of air. Nitric oxide can be prepared by the catalytic oxidation of ammonia.

In the process of this invention elemental phosphorus is contacted with an electronically-excited gas. The term reaction zone is used herein to described the area in which the elemental phosphorus is subjected to the plasma stream of electronically-excited carbon dioxide or nitric oxide to produce phosphorus trioxide. Any vessel, chamber, or container of any configuration or design is suitable for use as the reaction zone of the process of this invention. All that is necessary for the operation of the process of this invention is that the reaction zone be designed such that the elemental phosphorus can be subjected to the plasma stream of electronically-excited gas to produce phosphorus trioxide. Based on the disclosure given herein, a reaction zone can be constructed of a suitable design and from appropriate materials to accomplish the objects of this invention.

No specific temperatures are required in the reaction zone for conducting the process of this invention and the temperature used in the reaction zone can range from 0° C. to 500° C., preferably from 0° C. to 100° C. The process of this invention can be accomplished at room temperature, e.g., 20° C. to 30° C., and use of room temperature is a preferred embodiment of the process of this invention. At room temperature elemental phosphorus exists as a solid. Thus, elemental phosphorus in the form of a finely divided solid can be contacted with the electronically-excited gas, as for example, in a fluidized bed reactor. The phosphorus can also be contacted with the plasma stream of electronically-excited gas in a static bed reactor. Where higher temperatures are used, e.g., temperatures above the point at which elemental phosphorus exists as a vapor, elemental phosphorus vapor can be contacted with the plasma stream of electronically-excited gas to accomplish the objects of the process of this invention, e.g., the phosphorus vapor can be introduced into the reaction zone by being mixed with the plasma forming gas. The temperature used in the process of this invention is a temperature selected on the basis of choice, convenience and equipment design, rather than on the basis of any temperature requirements necessitated by the process of this invention.

An essential part of the process of this invention is the preparation of a plasma stream of electronically-excited gas. The nature of plasma is described in Melvin B. Gottleib, International Science & Technology, pp. 44–50, Aug., 1965; and Ind. & Eng. Chem., 55, 16–23, Jan., 1963. The technology of plasma flames and the production of plasma streams are relatively new having been described in the literature only in the past several years. One type of plasma flame which has been used and described in the literature is a DC plasma-jet. A number of articles on generating a plasma flame and on plasma technology are available in which plasma flames are used to achieve chemical syntheses not possible using typically chemical techniques. See Hans W. Leutner and Charles S. Stokes, Industrial and Engineering Chemistry, 53, pp. 341–342 (May, 1961); Hans W. Leutner, I&EC Process Design and Development, 1, pp. 166–168 (July, 1962); Charles S. Stokes, Chemical Engineering, pp. 191–194, 196, Apr., 1965, Masao Sugawara et al., U.S. Pat. No. 3,192,427, patented June 29, 1965, for Plasma Flame Generator; C. A. Papp, Chemical Engineering Progress, 59, pp. 51–53 (June, 1963); Industrial Engineering Chemistry, 55, pp. 16–23 (Jan., 1963); C. S. Stokes and W. W. Knipe, Industrial & Engineering Chemistry, 52, pp. 287–288 (April, 1960); and Thomas B. Reed, International Science & Technology, pp. 42–48, 76 (June, 1962).

Plasma streams of excited gases can be generated in other ways, as for example, where the gas used to form the plasma stream is subjected to an energy source other than an arc discharge, as for example, initiation of a plasma stream using a source of energy such as spark from a Tesla coil, gamma radiation as from a cobalt 60 cell, or electrons as from a hot tungsten filament, and the simultaneous irradiation of the stream with electromagnetic energy in the microwave frequency range. Once initiated the plasma stream is sustained using microwave energy. Use of a plasma stream is an essential part of the process of this invention.

A better understanding of the plasma stream used in the process of this invention can be obtained from the following discussion of the nature of the electronically-excited gas.

While not desiring to be bound by theory, it is believed that the plasma stream of electronically-excited gas exists as a stream of gas which is highly energetic and highly excited. Formation of the energetic and excited gas stream occurs as energy is gained by the gas during plasma formation and simultaneous irradiation with microwave energy. In the case of polyatomic gases such as carbon dioxide or diatomic gases such as nitric oxide, it is believed that energy states in the plasma stream are formed in which not only excited species of the polyatomic or diatomic gases are formed, e.g., molecules having an energy higher than that of the ground state, but in which the gases themselves are dissociated into their various atomic components, each of which has a considerably higher energy level than that which would be expected of the same material in its ground state. In addition, molecular fragments, positively charged nuclei, ions and electrons are believed to be present in the plasma stream. Use of carbon dioxide or nitric oxide not only supplies the oxygen needed in the formation of phosphorus trioxide but also provides energetic species having sufficient energy to cause the reaction with elemental phosphorus to occur. The process of this invention is accomplished by the transfer of sufficient energy from the gas used to disrupt the carbon-oxygen or nitrogen-oxygen bonds of the reductant to form free oxygen and the supplying of sufficient energy to cause the formation of an anhydride of trivalent phosphorus. It should be pointed out that for a better understanding of this invention, the same transformation of phosphorus to phosphorus trioxide can occur where a high energy state of the reductant, e.g., high energy carbon dioxide or high energy nitric oxide, upon collision with elemental phosphorus possesses not only sufficient energy but also the requisite oxygen present resulting in the formation of the phosphorus trioxide molecule.

The plasma stream of electronically-excited gas, i.e., carbon monoxide or nitric acid, needed to cause the formation of phosphorus trioxide from elemental phosphorus is characterized as the product of passing a stream of carbon dioxide or nitric oxide through a source of electromagnetic energy in the microwave range. Upon irradiation, the stream of gas absorbs the energy resulting in the formation of a plasma stream of electronically-excited carbon dioxide or nitric oxide. The electromagnetic energy in the microwave range suitable for use in the process of this invention can be produced using commercially available equipment and can range from 300 megaHertz to 100,000 megaHertz, preferably from 1,000 megaHertz to 5,000 megaHertz. Commercially available equipment such as a magnetron or a klystron can be used for production of the microwave energy. In these commercially available systems microwave energy is produced and conducted through waveguides or coaxial cable to an area of gas plasma formation. In the process of this invention the microwave energy is used to irradiate a stream of the gas to form a stream of electronically-excited carbon dioxide or nitric oxide. Magnetrons can be used to generate microwave energy over the frequency range of 300 to 10,000 megaHertz, and klystrons can be used to generate microwave energy having frequencies up to 100,000 megaHertz. The frequency range of 1,000 megaHertz to 5,000 megaHertz is preferred because the higher the frequency the smaller the waveguides resulting in smaller reaction zones with less capacity. Suitable microwave energy generators have power ratings ranging from less than 100 watts to greater than 30,000 watts. The specific microwave frequency and the power used are not critical so long as a plasma stream comprising electronically-excited carbon dioxide or nitric oxide is generated and sustained in the reaction zone to supply the energy necessary to cause the formation of phosphorus trioxide from elemental phosphorus.

The process of this invention is generally operated at reduced pressures, e.g., a pressure in the reaction zone of below 1 atmosphere. It is preferred that less than one atmosphere of pressure be used, e.g., from 0.001 atmosphere to 0.1 atmosphere, to facilitate generating and sustaining the gas plasma stream. An especially preferred pressure range is from 0.01 to 0.05 atmosphere. The pressure necessary is that pressure which allows a sustained plasma stream of electronically-excited carbon dioxide or nitric oxide to be used to convert elemental phosphorus to phosphorus trioxide. One skilled in the art can select a pressure at which the equipment can be operated to obtain the sustained gas plasma stream of electronically-excited nitric oxide or electronically-excited carbon dioxide.

The time necessary for the process of this invention in which elemental phosphorus is converted into phosphorus trioxide by being contacted with a plasma stream of electronically-excited gas is generally very short. The time necessary to achieve reaction in general will be a residence time in the reaction zone of from 0.5 milliseconds to 5 milliseconds, more normally from 1 millisecond to 3 milliseconds.

The determination of the optimum conditions for the operation of the process of this invention for a specific set of reaction conditions, e.g., temperature, reactant feed ratios, gas flow rate, reaction time, is within the skill of one knowledgeable in the art and can simply be accomplished by analysis of the reaction products obtained. For example, where carbon dioxide is used as the plasma-forming gas, the gas from the reaction zone can be analyzed for the amount of carbon monoxide present, as a measure of the amount of phosphorus trioxide formed. Appropriate adjustments in the operating conditions can be made. For example, where the yield of phosphorus trioxide is low (based on a low amount of carbon monoxide present), a longer residence time in the reaction zone may be necessary in order to allow a greater incidence of contact between the excited gas stream and the elemental phosphorus.

Once elemental phosphorus is contacted with the electronically-excited gas, the phosphorus trioxide formed is separated from the reaction products. The separation of phosphorus trioxide from the reaction products can be accomplished by conventional and well-known techniques. For example, the carbon monoxide or the nitrogen formed as the result of the reaction of elemental phosphorus with the electronically-excited carbon dioxide or nitric oxide can be removed by cooling the effluent gases from the reaction zone to below about 30° C. The phosphorus trioxide will solidify and subsequently the gaseous reaction products, e.g., carbon monoxide or nitrogen, can be pumped off and vented from the system. Any elemental phosphorus which is not converted into phosphorus trioxide in the reaction zone can be recycled as the starting material where desired.

In a preferred embodiment of the process of this invention the plasma flame of electronically-excited gas is established by initially forming an inert gas plasma flame, e.g., helium and irradiating it with microwave energy. Over a period of time carbon dioxide or nitric oxide is then mixed with the helium stream to form a mixed gas plasma stream such that just prior to the beginning of the reaction, the plasma stream is comprised solely of electronically-excited carbon dioxide or nitric oxide. Use of this embodiment is a matter of choice and a plasma flame can be established using carbon dioxide or nitric oxide initially, where desired.

The minimum amount of carbon dioxide or nitric oxide used to obtain the objects of the process of this invention is based on the amount of gas which is necessary stoichiometrically to transform the elemental phosphorus into phosphorus trioxide. For example, where carbon dioxide is used to transform the phosphorus into phosphorus trioxide, six moles of carbon dioxide are necessary for each mole of elemental phosphorus ($P_4$) converted into phosphorus trioxide. Where nitric oxide is used, six moles of nitric oxide per mole of elemental phosphorus are also used. Excess carbon dioxide and nitric oxide can be used where desired, e.g., up to about 100 moles of carbon dioxide or nitric oxide per mole of phosphorus. A preferred carbon dioxide or nitric oxide phosphorus molar ratio is 30:1 to 6:1. It is not desirable to use less than the stoichiometric amount of carbon dioxide from the standpoint of yields of phosphorus trioxide. Lower than the stoichiometric amount, e.g., from about 1 to 2 moles of phosphorus to carbon dioxide or nitric oxide will cause phosphorus trioxide formation but the yield of phosphorus trioxide will be correspondingly reduced.

The phosphorus trioxide produced in the process of this invention is produced in exceptionally pure form, e.g., from 95 percent to 99 percent pure. The product of the process of this invention, phosphorus trioxide, is valuable as an intermediate in the preparation of known builders for use in detergent compositions. For example, ethane-1-hydroxy-1,1-diphosphonic acid, and the salts thereof, can be prepared from the phosphorus trioxide obtainable from the process of this invention.

One method of preparing ethane-1-hydroxy-1,1-diphosphonic acid from phosphorus trioxide is described hereinafter. The phosphorus trioxide obtainable from the process of this invention is vaporized, or if the reaction zone is operated at a temperature at which the effluent gas contains phosphorus trioxide vapor, the vaporous phosphorus trioxide can be passed through a chamber in which the effluent gases are sprayed with acetic acid. Preparing ethane-1-hydroxy-1,1- diphosphonic acid from a gas stream containing vaporous phosphorus trioxide using an acetic acid spray is described in U.S. Pat. No. 3,532,461.

The procedure described by Whyte et al., supra, is suitable for the production of ethane-1-hydroxy-1,1-diphosphonic acid, or its salts, from the phosphorus trioxide prepared from the effluent gas from the reaction zone of the process of this invention. The ethane-1-hydroxy-1,1-diphosphonic acid or its salts are valuable as builders for use in detergent compositions.

The following examples are illustrative of the present invention and not intended in any way to limit the full scope of the invention as described herein.

EXAMPLES

Apparatus

The apparatus used comprised a reaction zone, equipment for generating electromagnetic energy in the microwave range, a phosphorus vaporizer, and a phosphorus trioxide separation and recovery system.

The reaction zone comprised a 13 millimeter o.d. vertically oriented quartz tube connected at the bottom through a heated gas inlet tube to a source of argon and to a source of gas to be electronically excited, e.g., carbon dioxide or nitric oxide, and via a side arm attachment to the phosphorus vaporizer. The reaction zone was connected at the top to the phosphorus trioxide separation and recovery system.

The microwave generator comprised a magnetron (Litton L-3460) powered by a Litton Model 218 power source. The magnetron was tunable over a microwave range of 2,350 to 3,570 megaHertz and the power source could be controlled from less than 100 watts to greater than 1,500 watts. The microwave energy was conducted through waveguides to a microwave cavity surrounding the reaction zone. The microwave cavity was air cooled to control the temperature within the range of 30° C. to 50° C. The entire system was air cooled to prevent overheating of the quartz glassware reaction zone.

The phosphorus vaporizer was a heated inlet tube connected at the side of the reaction zone near the bottom. The phosphorus vaporizer was wrapped with a resistance wire and electrically heated to about 150° C. The phosphorus vaporizer was connected to a source of argon for sweeping the phosphorus vapor into the reaction zone.

The phosphorus trioxide separation and recovery system comprised a series of cold traps for collection of the phosphorus trioxide reaction products and to a vacuum pump for evacuation of the apparatus and removal of gaseous reaction by-products. The vacuum pump used to control the pressure within the system and to exhaust the system of gaseous reaction products was a Cenco high-vac 28 pump with a pumping speed of about 220 liters per minute at 1.0 torr (1 torr equals 1 mm. Hg).

Volatile products formed during reaction were condensed in cold traps cooled with solid carbon dioxide/acetone slurry. Any gaseous reaction products such as carbon monoxide and nitrogen or unreacted carbon dioxide and nitric oxide were vented from the system.

The analysis of phosphorus trioxide produced in the reaction zone to determine yields was performed idiometrically by the method of Jones and Swift, Anal. Chem., 25, 1,272-4 (1953).

EXAMPLE I

Preparation of $P_4O_6$

Yellow phosphorus (25 g. charge) was placed in the phosphorus vaporizer and the system was purged with helium. The entire system was evacuated to a pressure of 1 torr. Carbon dioxide was passed into the reaction zone through the gas inlet tube in the bottom of the reaction zone. A plasma flame was initiated with a spark from a Tesla coil and simultaneous irradiation of microwave energy. The magnetron providing the microwave energy was tuned to a frequency of 2,450 megaHertz at a power of 700-900 watts. As soon as the plasma stream of electronically-excited carbon dioxide had stabilized, vaporous phosphorus was swept into the reaction zone by passing helium through the phosphorus vaporizer at a temperature of 52°-75° C. The system was operated for 205 minutes with 2,096 millimoles of carbon dioxide being passed. 8.08 millimoles of phosphorus trioxide (23.9 percent yield based on 33.8 millimoles of phosphorus used) was formed in essentially pure form.

EXAMPLE II

Preparation of $P_4O_6$

The procedure of Example I was repeated except that violet phosphorus (25 g.) was charged in the phosphorus vaporizer, the phosphorus vaporizer heated to 300°-330° C. and 101 millimoles of carbon dioxide was passed through the reaction zone. The system was operated for 37 minutes and 1.57 millimoles (27.5% yield based on 5.7 millimoles of phosphorus vaporized) of phosphorus trioxide was obtained in essentially pure form.

EXAMPLE III

Preparation of $P_4O_6$

The procedure of Example I was repeated except that nitric oxide was substituted for the carbon dioxide as the plasma forming gas and violet phosphorus was used in the vaporizer heated to 390°-411° C. The system was operated for 150 minutes with 693 millimoles of nitric oxide being passed. Phosphorus trioxide was obtained in essentially pure form.

EXAMPLE IV

Preparation of $P_4O_6$

APPARATUS

The apparatus used comprised a reaction zone, equipment for generating electromagnetic energy in the microwave range, and a phosphorus trioxide separation and recovery system.

The reaction zone comprised at 25 mm. o.d. vertically oriented quartz tube, 14 inches in length, tapered at the bottom to a cone at which point a gas inlet tube was attached. The cone angle and the gas flow rate was such that a spouting bed of 4 to 6 ccs. in volume was formed when a mixture of sand and violet phosphorus was placed (2:1 by volume) in the cone and the plasma-forming gas, nitric oxide, was passed into the reaction zone through the finely divided mixture. Thus, nitric oxide passing through the gas inlet tube and and into the reaction zone formed a fluidized bed of sand carrying elemental phosphorus with it within the reaction zone. A plasma stream was formed in the reaction zone above the fluidized bed. Passage of the nitric oxide through the mixture of sand and phosphorus caused the circulation of particles of violet phosphorus into the plasma region.

The equipment for generation of electromagnetic energy in the microwave range comprised a magnetron (Litton L-3460) powered by a Litton Model 218 power source. The magnetron was tunable in frequency in the microwave range of from 2,350 to 3,575 megaHertz and the power source could be controlled from less than 100 watts to greater than 1,500 watts. The microwave energy generated by the magnetron was conducted through waveguides to a microwave cavity surrounding the reaction zone. The reaction zone was air cooled to control the temperature within the range of 30° C. to 50° C.

The phosphorus trioxide separation and recovery system comprised a gas exit tube connected to a spherical filter chamber 3 inches in diameter filled with glass wool for removal of any solid material, to a series of cold traps, cooled with a solid carbon dioxide/acetone slurry for condensation and collection of the phosphorus trioxide product, and to a vacuum pump for control of the pressure in the system and for removal of any gaseous by-products formed in the reaction. The vacuum pump used to control the pressure within the system and to exhaust the entire reaction system was a Cenco Hi-vac 28 vacuum pump with a pumping speed of about 220 liters per minute at 1.0 torr.

PROCEDURE

The reaction zone was charged with a mixture of 25 g. of violet phosphorus and of sand in a 1 to 2 by volume ratio. Evacuation of the system was begun slowly to prevent transfer of the phosphorus/sand mixture from the reaction zone into the glass wool filter chamber. Upon evacuation to a pressure of 1 torr, mechanical vibration of the bed was started by passing nitric oxide through the bed of phosphorus and sand. As soon as the fluidized bed had stabilized, the magnetron was turned on to a frequency of 2,450 megaHertz at a power of 700–900 watts. The nitric oxide plasma flame was then ignited with the aid of a Tesla coil. The plasma of electronically-excited nitric oxide was operated for 15 minutes with 27 millimoles of nitric oxide being passed. 1.52 millimoles (28.8 percent yield) of phosphorus trioxide was formed in essentially pure form.

What is claimed is:

1. A process for preparing an anhydride of trivalent phosphorus comprising subjecting elemental phosphorus to a plasma stream of an electronically-excited gas selected from the group consisting of carbon dioxide and nitric oxide in a reaction zone having a temperature of from 0° to 500° C., said plasma stream being characterized as a stream of gas irradiated with electromagnetic energy having a frequency of from 300 megaHertz to 100,000 megaHertz.

2. The process of claim 1 wherein the gas is carbon dioxide.

3. The process of claim 2 wherein the frequency is from 1,000 megaHertz to 5,000 megaHertz.

4. The process of claim 3 wherein the reaction zone has a temperature of from 0° to 100° C.

5. The process of claim 4 wherein the reaction zone is operated at a pressure of from 0.001 atmosphere to 0.1 atmosphere.

6. The process of claim 5 wherein the molar ratio of elemental phosphorus to the gas is from 1:6 to 1:100.

7. The process of claim 5 wherein the molar ratio of elemental phosphorus to the gas is from 1:6 to 1:30.

8. A process for preparing an anhydride of trivalent phosphorus comprising:
   1. forming a plasma stream of an electronically-excited gas selected from the group consisting of carbon dioxide and nitric oxide in a reaction zone having a temperature of from 0° C. to 500° C., said plasma stream being characterized as a stream of gas irradiated with electromagnetic energy having a frequency of from 300 megaHertz to 100,000 megaHertz;
   2. subjecting elemental phosphorus to the plasma stream of electronically-excited gas to form an anhydride of trivalent phosphorus; and
   3. separating the anhydride of trivalent phosphorus.

9. The process of claim 8 wherein the gas is carbon dioxide.

10. The process of claim 9 wherein the frequency is from 1,000 megaHertz to 5,000 megaHertz and wherein the reaction zone has a temperature of from 0° C. to 100° C.

11. The process of claim 10 wherein the reaction zone is operated at a pressure of from 0.001 atmosphere is 0.1 atmosphere.

12. The process of claim 11 wherein the molar ratio of elemental phosphorus to the gas is from 1:6 to 1:100.

13. The process of claim 12 wherein the molar ratio of elemental phosphorus to the gas is from 1:6 to 1:30.

* * * * *